United States Patent

[11] 3,594,845

[72] Inventor Glenn J. Eggert
 Columbus, Ohio
[21] Appl. No. 730,445
[22] Filed May 20, 1968
[45] Patented July 27, 1971
[73] Assignee Houdaille Industries, Inc.
 Buffalo, N.Y.

[54] PROGRAM CIRCUIT FOR AUTOMATIC BUFFING EQUIPMENT
 8 Claims, 4 Drawing Figs.

[52] U.S. Cl. ..................................... 15/97,
 190/24.4, 324/70
[51] Int. Cl. ..................................... B24b 29/00
[50] Field of Search ........................... 90/24.3,
 13.5; 51/165.01, 165.03, 135; 318/39, 432, 433;
 324/70 B; 118/4; 15/97, 102, 21, 4

[56] References Cited
 UNITED STATES PATENTS
3,189,994 6/1965 Jones ........................... 90/24.3
3,313,129 4/1967 Stock ........................... 324/70 B Primary Examiner—Walter A. Scheel
Assistant Examiner—Leon G. Machlin
Attorney—Hill, Sherman, Meroni, Gross and Simpson ABSTRACT: A program circuit for an automatic buffing system having a pulse generator for generating a sequence of signals which are keyed to the movement of a conveyor which carries the object to be buffed. A large number of signals are generated as the object being buffed passes beneath the buffing wheel. Each one of these signals being so generated is utilized to control a stepping motor which in turn moves a rotary switch having 100 terminals through one complete revolution for each pass of an object beneath the buffing wheel. A plurality of power selection signals are applied to each of the 100 terminals on the rotary switch, and the rotation of the switch applies each of the various power levels to a control circuit for developing a desired power at the buffing wheel in sequence in accordance with a preselected program. In this way, an irregularly contoured object may be buffed fully automatically.

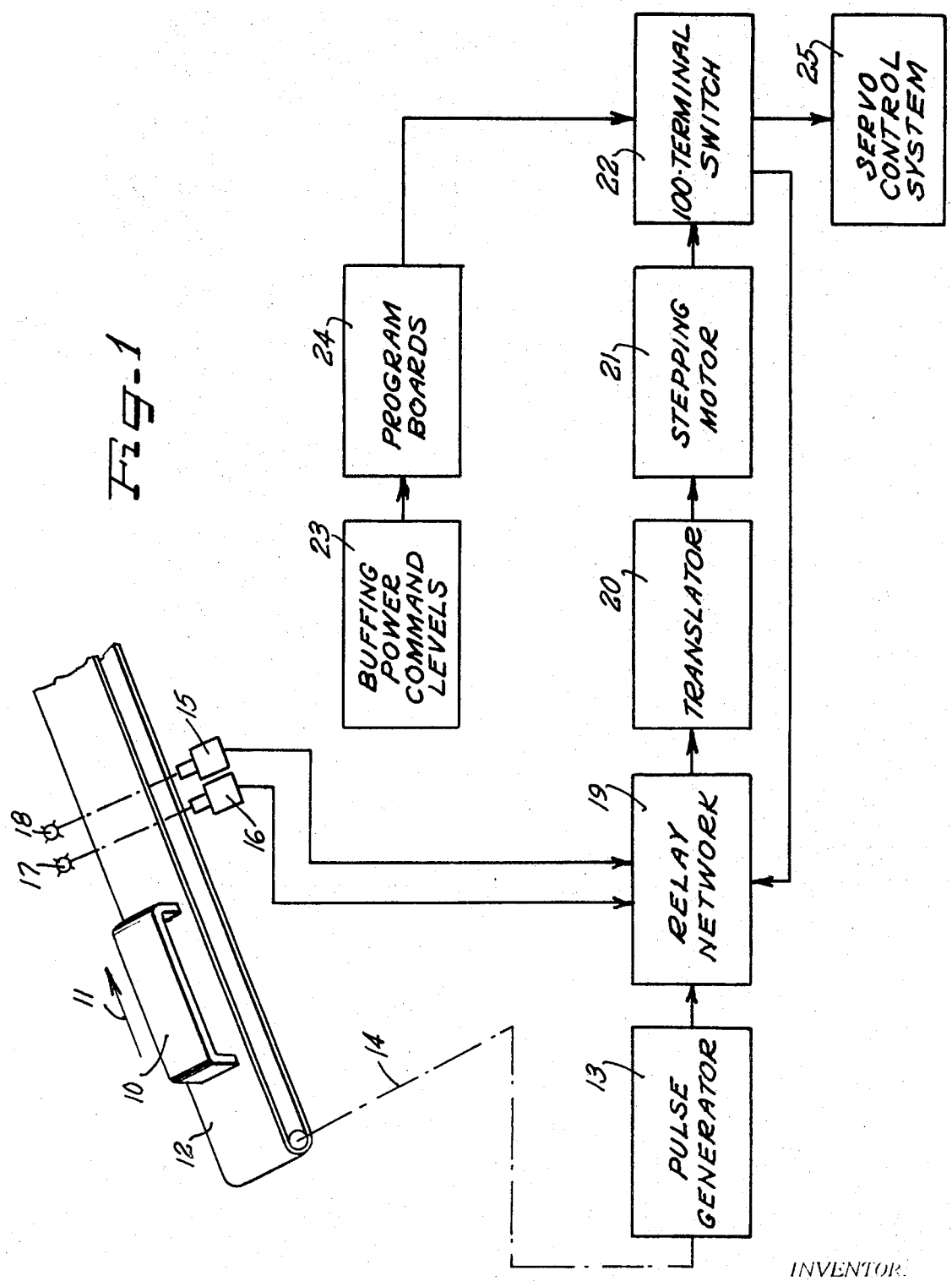

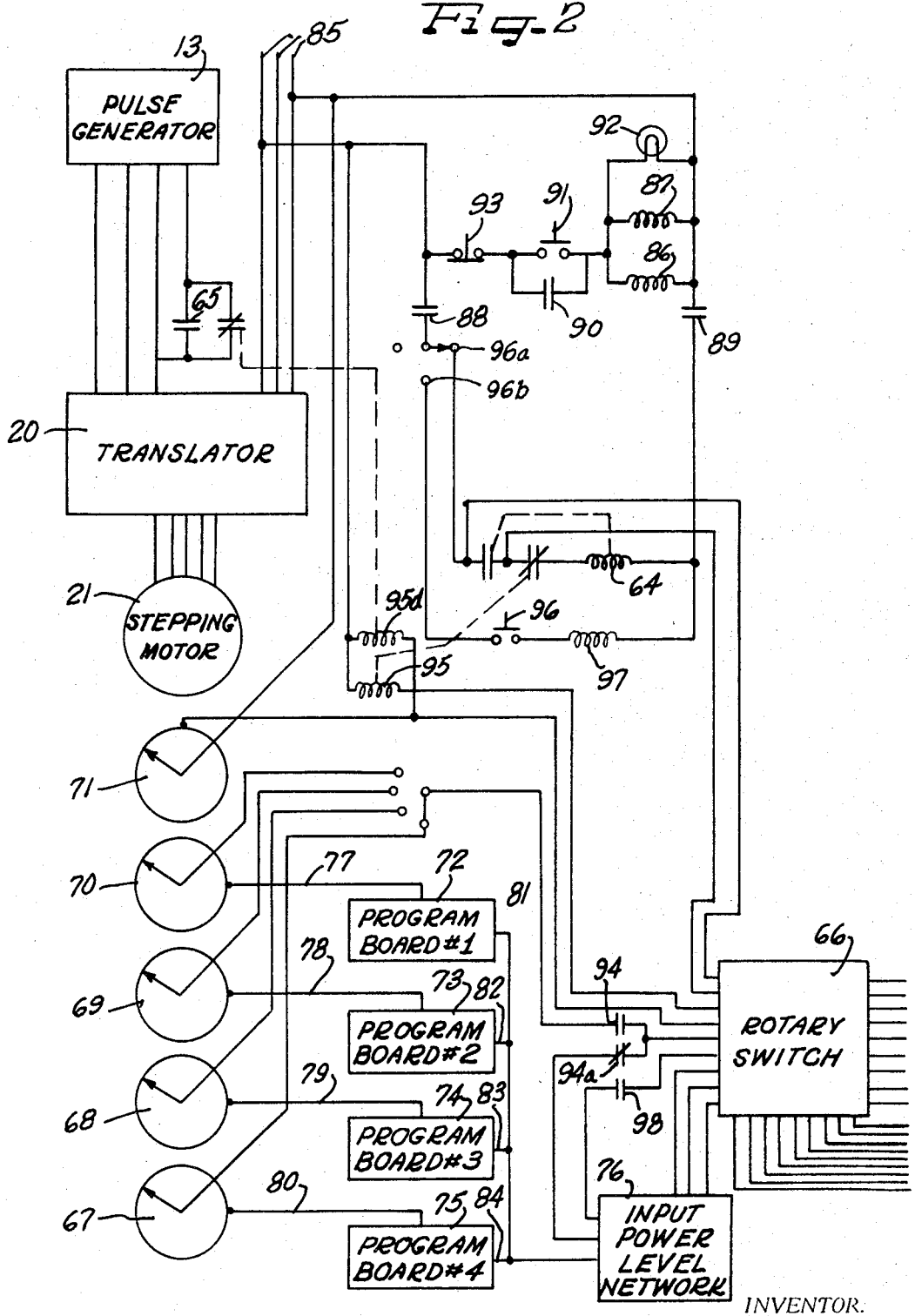

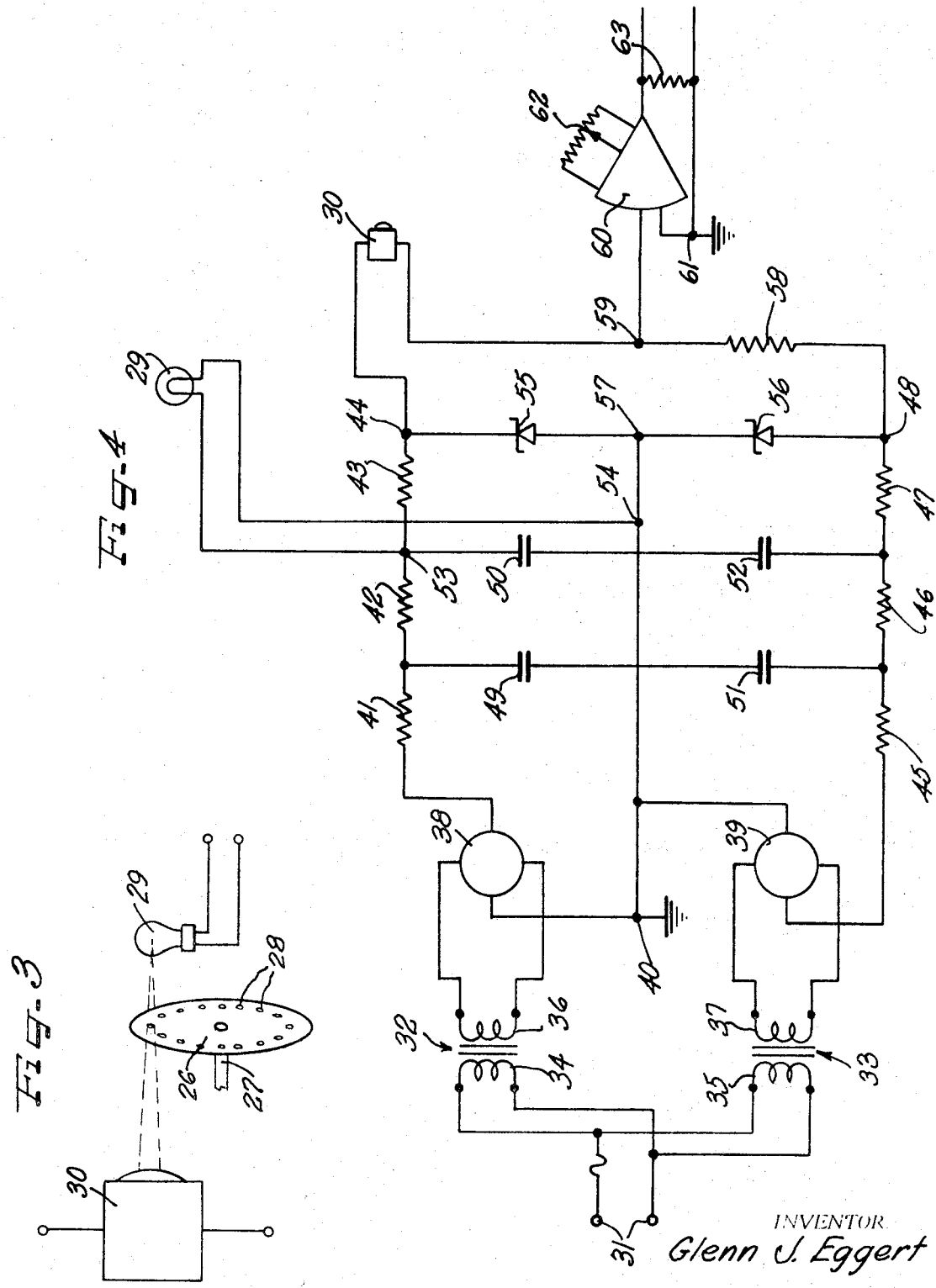

PROGRAM CIRCUIT FOR AUTOMATIC BUFFING EQUIPMENT

BACKGROUND OF THE INVENTION

Field of the Invention

The field of art to which this invention pertains is an automatic system for preprogramming the buffing of an irregularly contoured object so as to instantaneously increase or decrease the buffing power as required. In particular, this invention relates to a preprogramming system for automatically buffing an object moving on a continuously operating conveyor.

SUMMARY

It is an important feature of the present invention to provide an improved automatic buffing control system.

It is another feature of the present invention to provide an improved buffing system for buffing an irregularly contoured object continuously moving on a conveyor means.

It is an important object of the present invention to provide an improved program circuit for an automatic buffing control system.

It is another object of the present invention to provide a program circuit for instantaneously applying a predetermined power level to a control circuit for developing a proportional power level at a buffing wheel at a number of discrete intervals during the buffing of an object moving on a continuously feeding conveyor.

It is a further object of this invention to provide a program circuit for an automatic buffing control system which includes a pulse generator for generating a series of signals in sequence which are keyed to the feed speed of the conveyor carrying the object to be buffed.

It is an additional object of this invention to provide a program circuit for an automatic buffing control system having a pulse generator as described above and including a rotary switch which is moved through a complete revolution during the pass of an object to be buffed beneath the buffing wheel and wherein the rotary switch applies a large number of sequential power levels to a control circuit during the incremental movement of the object on the conveyor.

It is also an object of this invention to provide a program circuit for an automatic buffing control system which in essence, subdivides an object moving along a conveyor into a large number of incremental length units and which develops a control signal as each incremental unit passes beneath the buffing wheel and which utilizes the control signal to apply a preprogrammed power level to the buffing wheel thereby providing an improved fully automatic means for buffing an irregularly contoured continuously moving object.

It is yet another object of the present invention to provide an improved control buffing system for fully automatically buffing irregularly contoured objects such as automobile bumpers.

These and other objects, features and advantages of the present invention will be understood in greater detail from the following description and the associated drawings wherein reference numerals are utilized in designating an illustrative embodiment.

BRIEF DESCRIPTION OF THE DRAWINGS

FIG. 1 is a block diagram of a buffing control system utilizing features of the present invention;

FIG. 2 is a partial schematic, partial block diagram showing the program circuit of the automatic buffing control system of FIG. 1;

FIG. 3 shows in schematic form, a signal means for developing a sequence of signals which are keyed to the movement of the conveyor carrying the objects to be buffed, and FIG. 4 is a schematic showing the pulse-generator of the present invention as supplemented by the device shown in FIG. 3.

DESCRIPTION OF THE PREFERRED EMBODIMENT

The present invention contemplates the use of an automatic circuit for regulating the power delivered to a buffing head as an object being buffed passes beneath the head as further described in copending applications entitled "CONTROL CIRCUIT FOR AUTOMATIC BUFFING EQUIPMENT," Ser. No. 714,632, and now abandoned for continuation Ser. No. 845,636, and "AUTOMATIC BUFFING CONTROL SYSTEMS," Ser. No. 730,438, and filed of even date herewith. For instance, an irregularly contoured object, such as an automobile bumper may be moved along a conveyor system and beneath a buffing head in accordance with the present invention. Once the control circuit senses the presence of the bumper at the buffing head, a series of pulses are generated which are used as control signals to operate a stepping motor. The stepping motor then rotates a rotary switch having 100 terminals, for instance. Each of these terminals are coupled to a power level source which is preselected to be proportional to the optimum power for the buffing head when the associated portion of the moving bumper reaches the head. In other words, each of the pulses generated by the pulse generator corresponds to a given increment of the bumper beneath the buffing head in its forward travel. Each of these pulses are then utilized to select a given power level which is proportional to the desired power at the buffing head in accordance with the known contour of the bumper. In this way, the buffing operation is fully automatically programmed for optimum results.

A control system in which the program circuit of the present invention is operative is shown diagrammatically in FIG. 1. In particular, an object such as a bumper 10 may be moved in the direction of the arrow 11 along a continuously moving conveyor 12. A pulse generator 13 is mechanically coupled by means of linkages or the like illustrated by the reference numeral 14 to the movement of the conveyor 12. In this way, a pulse is generated when each incremental length of the conveyor passes beneath the buffing head.

A pair of photorelays indicated generally by the numerals 15 and 16 are actuable by the interruption of a light beam from light sources 17 and 18, respectively. The interruption of the beam is provided by the moving bumper 10 along the conveyor 12.

When the relays 15 and 16 detect the presence of the bumper 10 beneath the buffing head, the relay network 19 is actuated, and the output signals from the pulse generator 13 are coupled to a translator 20. The translator 20 detects the incoming signals and generates an appropriate response for controlling a stepping motor 21 which in turn actuates a 100 terminal rotary switch 22. A series of buffing power levels, for instance, 10 levels, 23 is coupled by means of a program board 24 to the 100 terminal switch. The program board, for instance, may contain 100 contacts, each being established at a given power level and each being coupled to one terminal of the 100 terminal rotary switch. In this way, the output of the rotary switch 22 will be a program signal having an instantaneous power level which is proportional to the optimum desired buffing power at the bumper 10. This power level is then coupled to a servo control system 25 for increasing or decreasing the degree of contact of the buffing wheel at the bumper 10.

Referring to FIG. 2, the pulse generator 13 is shown coupled to the translator 20 and hence to the stepping motor 21.

A basic concept behind the programming system is to divide the bumper 10 into 100 length increments and to provide a choice of 10 buffing horsepowers for each increment of bumper length. The pulse generator 13 is the element of the system which divides the bumper into increments. It does this by generating pulses at a rate proportional to the speed of the conveyor.

Referring to the pulse generator as shown in FIGS. 3 and 4, it is seen that the only moving element of the pulse generator is a disc 26 which is driven about an axis 27 directly by the conveyor 12. The disc has a series of holes or apertures 28 which alternately transmit and block the light from a light bulb 29 to a photodiode 30. As is well understood, the photodiode 30 is a resistor which changes resistance when the intensity of the light falling on it changes. This property is used to drive an operational amplifier into either plus saturation or minus saturation as shown in FIG. 4. The amplifier alternately saturates from plus to minus as the disc 26 rotates.

The pulse generator may be supplied through a standard 115-volt line source 31 which is coupled to a pair of transformers 32 and 33. The transformers 32 and 33 have primary windings 34 and 35, respectively, and secondary windings 36 and 37, respectively. The output of these transformers are coupled to diode bridges 38 and 39 which are grounded at a common terminal 40.

The output of the diode bridge 38 is coupled through three resistors 41, 42 and 43 to a circuit point 44. Similarly, the output from the bridge 39 is coupled through three resistors 45, 46 and 47 to a circuit point 48. Filter capacitors 49, 50, 51 and 52 are coupled from points between the output resistors to ground at the point 40 as shown.

The light source of the pulse generator may be coupled across the capacitor 50 to terminals 53 and 54.

A pair of zener diodes 55 and 56 are coupled between the terminals 44 and 48 and have a common junction point 57. The diode 55 is coupled to have a DC positive going voltage of approximately 17.5 volts at the junction point 44, while the diode 54 is coupled to have a negative going DC voltage of approximately 17.5 volts at the terminal 48. The photoresistor or photodiode 30 is coupled together with a resistor 58 as a voltage divider across the total DC voltage signal of approximately 35 volts between the terminals 44 and 48.

When no light impinges on the photodiode 30, the diode has a high resistance thereby sustaining a large voltage drop and generating a negative output at a terminal 59. During the time interval when light from the source 29 impinges on the diode 30, the resistance of the diode sharply decreases thereby placing a substantial voltage drop across the resistor 58 and causing a positive signal to appear at the terminal 59. An operational amplifier 60 has an input coupled to the terminal 59 and a terminal grounded as at 61. A balance potentiometer 62 is provided, and an output resistance 63 fixes the output impedance of the amplifier. The amplifier output is then coupled directly to the translator 20 as shown in FIG. 2.

As long as the conveyor 12 is running, the amplifier 60 is putting out the square wave pulses, but the pulses are only used when a bumper, such as the bumper 10, is in the correct position for buffing. When a bumper reaches the buffing head, the bumper detector, 15 and 16, signals the start of a program. It does this with the two photoelectric relays 15 and 16 as illustrated in FIG. 1. When the bumper interrupts the light to both photorelays, another relay 64 is energized. Through normally open contacts, 65 on the relay 64, the pulses go from the pulse generator to the translator 20.

The translator 20 senses the negative rate of change of voltage associated with each square wave pulse and converts these pulses into the proper signal to drive the stepping motor 21. The stepping motor steps 3.6°, for example, every negative change in voltage.

Coupled to the stepping motor 21 is a 100 terminal rotary switch 22 which includes five terminal levers 67, 68, 69, 70 and 71. Each of the 100 terminals on a given level, such as the level 70, represent an increment of bumper length. For each bumper that is buffed, the stepping motor drives the switch through one revolution. Each of these 100 terminals contains a voltage corresponding to a command for a particular buffing horsepower. The wiper of the switch passes over the terminals as the bumper passes under the buff. It picks off the buffing command voltage for each increment and sends it to the servoamplifier which causes the buffing wheel to be pressed harder or less hard against the bumper, depending on the horsepower level commanded.

The voltages to each of the 100 terminals on the rotary switch are obtained from program boards 72, 73, 74 and 75 and from an input power level network 76. The program boards are made up of 100 vertical wires illustrated by the wires 77, 78, 79 and 80 and 10 horizontal wires illustrated by the wires 81, 82, 83 and 84. Each of the 100 vertical wires is connected to a corresponding terminal on the rotary switch, and corresponds to a particular station along the length of the bumper 10. Each of the 10 horizontal wires has a different voltage on it from the input power level network 76. By inserting a shorting pin in a hole in the respective program board, a connection is made between a horizontal wire and a vertical wire. Thus, there is a choice of 10 voltages for each of the 100 terminals on the rotating switch. In this way, the program board is used to give a buffing horsepower command for each increment of bumper length.

The programmer will only go into an automatic cycle if the conveyor is running since means are provided to establish a 0 voltage level at terminals 85 if the conveyor is off and a normal 115-volt level if the conveyor is on. Also, the "start" button must have been pressed after the conveyor has started. In this way, relays 86 and 87 may be energized closing contacts 88, 89 and 90. The "start" button is indicated by the reference numeral 91. A signal lamp 92 is coupled in parallel with the relays 86 and 87.

If the above two described conditions are satisfied, the two photorelays 15 and 16 will detect the presence of a bumper by energizing the relay 64, and the automatic cycle will start. Pulses will go to the translator 20; the stepping motor will turn the switch 22; and the buffing horsepower will be controlled by the position of the shorting pins on the program boards 72, 73, 74 and 75.

The cycle can be interrupted in two ways, by pressing a "stop" button 93 or by turning off the conveyor to bring the voltage at the terminals 85 to zero. Either of these conditions deenergizes the relays 86 and 87 and through a pair of contacts 94, the wire carrying the voltages from the rotary switch and program boards is opened. At the same time, normally closed contacts 94a are closed, thereby introducing a different prechosen command voltage. This command would be for a negative buffing power and thus would cause the buffing head to retract upward away from the bumper.

The automatic cycle stops itself when the stepping motor 21 and the rotary switch 66 have made one complete revolution and the bumper has passed. When this revolution is completed, contact is made on terminal number one of the control level 71 of the rotary switch 22, and a relay 95 is energized. This deenergizes relay 64, and pulses are prevented from going to the translator 20. After the cycle is completed, the buffing command voltage still comes from the rotary switch 66, therefore, the first pin in the program board must call for an up command.

Manual operation may be achieved by rotating a contact 96a to a position 96b and using a switch 96 which when closed energizes a relay 97 for closing a pair of normally open contacts 98, thereby applying a given power level to the control system 25 (FIG. 1).

It will be apparent to those skilled in the art that various combinations and modifications of the features described herein may be accomplished without departing from the basic features of the present invention, and I desire to claim all such modifications and combinations as properly come within the spirit and scope of my invention.

I claim as my invention:

1. In an automatic buffing system having a buffing head, motor means for driving said head into buffing contact with a product being buffed, and a conveyor for moving said product relative to said buffing head, a program circuit for regulating the power delivered to said motor means comprising:

means for generating a sequence of signals, each of said signals being associated with an increment of movement of said conveyor relative to said buffing head and each of said signals being generated following the movement of said associated increment past said buffing head, means for establishing a number of circuit points corresponding to a number of discrete power sources, and means responsive to each one of said signals for utilizing the power source at one of said circuit points to control said motor means, thereby programming the power of said buffing head to the position of a product being buffed.

2. A program circuit in accordance with claim 1 wherein said means for generating a sequence of signals comprises a pulse generator, and means for keying the generating of pulses from said pulse generator to the movement of said conveyor, whereby the generating of each pulse corresponds to the movement of an increment of said conveyor past said buffing head.

3. A program circuit in accordance with claim 2 wherein said pulse generator comprises:
a rotatable disc having a number of apertures arranged about the center thereof and means for rotating the same,
a photosensitive element,
a light source and means for passing light therefrom through one of said apertures and for impinging the same on said photosensitive element,
circuit means including said photosensitive element for generating a pulse each time one of said apertures is rotated into alignment with both said light source and said photosensitive element.

4. A program circuit in accordance with claim 3 wherein said means for keying the generating of pulses to the movement of said conveyor comprises mechanical means for coupling said rotatable disc to said conveyor whereby increasing the speed of said conveyor results in an increase in the speed of said disc.

5. In an automatic buffing system having a buffing head, motor means for driving said head into buffing contact with a product being buffed, and a conveyor for moving said product relative to said buffing head, a program circuit for regulating the power delivered to said motor means comprising:
means for generating a signal in response to each advancement of a given incremental length of said conveyor, a sequentially operative power selection device having a number of prearranged available power level sources,
means for coupling said signals to said sequentially operative power selection device,
said sequentially operative power selection device being responsive to each of said signals for selecting in sequence one of a number of said prearranged power level sources, and means for utilizing said selected power level source to control said buffing motor means.

6. A program circuit in accordance with claim 5 wherein said means for coupling said signal to said sequentially operative power selection device comprises switch means and means for sensing the presence of a product on said conveyor and beneath said buffing head and for actuating said switch means in response thereto.

7. A program circuit in accordance with claim 5 wherein said means for generating a signal in response to the advancement of a given incremental length of said conveyor comprises:
a rotatable disc having a number of apertures arranged about the center thereof,
means for rotating said disc at a fixed speed ratio to said conveyor,
a photosensitive element,
a light source and means for passing light therefrom through one of said apertures and for impinging the same on said photosensitive element,
circuit means including said photosensitive element for generating a pulse each time one of said apertures is rotated into alignment with said light source and said photosensitive element.

8. In an automatic buffing system having a buffing head, motor means for driving said head into buffing contact with a product being buffed, and a conveyor for moving said product relative to said buffing head, a program circuit for regulating the power delivered to said motor means comprising:
pulse generator means having an output,
means coupled to said pulse generator means for keying the generation of pulses therefrom to the advancement of said conveyor,
a rotary switch means having a number of terminals, and an output means sequentially connectable to each of said terminals through the rotation of said switch, stepping motor means for advancing said rotary switch, means for coupling the output of said pulse generator to said stepping motor means,
means for applying a given power level to each of said terminals of said rotary switch,
and means for utilizing the output of said rotary switch to control said buffing head motor means.